United States Patent
Prause et al.

(10) Patent No.: US 11,086,914 B2
(45) Date of Patent: Aug. 10, 2021

(54) ARCHIVING OF TOPMOST RANKED ANSWERS OF A COGNITIVE SEARCH

(71) Applicant: International Business Machines Corporation, Armonk, NY (US)

(72) Inventors: Thomas Prause, Rottenburg (DE); Ernesto Puig Rodriguez, Reutlingen (DE); Reinhard T. Buendgen, Tuebingen (DE); Joerg Mueller, Horb (DE)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/154,232

(22) Filed: Oct. 8, 2018

(65) Prior Publication Data

US 2020/0110837 A1 Apr. 9, 2020

(51) Int. Cl.
| | |
|---|---|
| *G06F 16/30* | (2019.01) |
| *G06F 16/33* | (2019.01) |
| *G06F 16/38* | (2019.01) |
| *G06F 16/93* | (2019.01) |
| *G06F 16/11* | (2019.01) |

(52) U.S. Cl.
CPC ........ *G06F 16/3349* (2019.01); *G06F 16/113* (2019.01); *G06F 16/38* (2019.01); *G06F 16/93* (2019.01)

(58) Field of Classification Search
CPC .. G06F 16/2379; G06F 16/248; G06F 16/252; G06F 3/0484
USPC ........................................................ 715/722
See application file for complete search history.

(56) References Cited

U.S. PATENT DOCUMENTS

| | | |
|---|---|---|
| 5,680,481 A | 10/1997 | Prasad et al. |
| 5,828,793 A | 10/1998 | Mann |
| 6,269,368 B1 | 7/2001 | Diamond |
| 6,632,174 B1 | 10/2003 | Breznitz |
| 8,280,838 B2 | 10/2012 | Ferrucci et al. |
| 9,292,262 B2 | 3/2016 | Gabel et al. |

(Continued)

OTHER PUBLICATIONS

IBM, "The DeepQA Research Team", IBM Research, last updated Jan. 27, 2011, printed Aug. 31, 2018, 5 pages http://researcher.watson.ibm.com/researcher/view_group_subpage.php?id=2159.

(Continued)

*Primary Examiner* — Kuen S Lu
(74) *Attorney, Agent, or Firm* — Daniel M. Yeates

(57) ABSTRACT

A method for archiving of documents of a query against a cognitive system can be provided. The cognitive system comprises at least a cognitive engine, several stored documents, and a learned model. The method comprises determining a plurality of evidence fragments, a related first list of documents and related metadata. The method also comprises removing a document from the stored documents, redetermining as second result a second list of documents, comparing the first and second list of documents, and upon determining identical documents in the compared first and second list of documents up to a confidence cliff, removing another document. Furthermore, the method comprises repeating the steps of removing, redetermining, and comparing until the first list of documents and the second list of documents differ above the confidence cliff and storing metadata of the documents of the first list, the plurality of evidence fragments, and the first query.

20 Claims, 8 Drawing Sheets

(56) References Cited

U.S. PATENT DOCUMENTS

| | | | |
|---|---|---|---|
| 9,330,720 B2 | 5/2016 | Lee | |
| 9,367,605 B2 * | 6/2016 | Luo | G06F 16/345 |
| 9,516,053 B1 * | 12/2016 | Muddu | G06F 16/254 |
| 2002/0184107 A1 * | 12/2002 | Tsuda | G06Q 30/06 |
| | | | 705/26.81 |
| 2007/0111172 A1 | 5/2007 | Kinard | |
| 2008/0027933 A1 * | 1/2008 | Hussam | G06F 16/338 |
| 2010/0097952 A1 | 4/2010 | McHenry et al. | |
| 2014/0207622 A1 * | 7/2014 | Vijayaraghavan | G06F 16/951 |
| | | | 705/26.62 |
| 2014/0282586 A1 * | 9/2014 | Shear | G06F 16/248 |
| | | | 718/104 |
| 2014/0366111 A1 * | 12/2014 | Sheller | G06F 21/31 |
| | | | 726/7 |
| 2015/0356423 A1 | 12/2015 | Sanchez et al. | |
| 2016/0098477 A1 | 4/2016 | Berajawala et al. | |
| 2016/0147757 A1 | 5/2016 | Adderly et al. | |
| 2016/0203221 A1 * | 7/2016 | Rao | G06Q 50/01 |
| | | | 707/707 |
| 2017/0337294 A1 | 11/2017 | Allen et al. | |
| 2018/0204111 A1 * | 7/2018 | Zadeh | G06K 9/3233 |
| 2019/0163875 A1 * | 5/2019 | Allen | G16H 70/20 |

OTHER PUBLICATIONS

Wikipedia, "Watson (Künstliche Intelligenz)", Wikipedia the Free Encyclopedia, printed Aug. 31, 2018, 7 pages https://de.wikipedia.org/wiki/Watson_%28K%C3%BCnstliche_Intelligenz%29.

Fineout-Overholt et al., "Finding Relevant Evidence to Answer Clinical Questions", Chapter 3, 31 pages.

IBM, "Boosting productivity and efficiency" Decoding cognitive business, Apr. 9, 2018, 12 pages.

* cited by examiner

500

| doc-id | confidence | grade | Score | title |
|---|---|---|---|---|
| 184 | 0,508266104 | 0 | 19,30447 | Title-1 |
| 12 | 0,290420145 | 0,21784596 | 17,660955 | Titel-2 |
| 51 | 0,27064521 | 0,01977493 | 22,435382 | Title-3 |
| 486 | 0,246490677 | 0,02415453 | 21,357615 | Title-4 |
| 875 | 0,203804374 | 0,0426863 | 10,776411 | Title-5 |
| 13 | 0,165756315 | 0,03804806 | 11,809418 | Title-6 |
| 663 | 0,135654875 | 0,03010144 | 10,657345 | Title-7 |
| 141 | 0,101648198 | 0,03400806 | 12,942465 | Title-8 |
| 746 | 0,09015584 | 0,01149098 | 13,647741 | Title-9 |
| 878 | 0,075363808 | 0,01451776 | 16,421043 | Title-10 |
| .... | .... | .... | .... | .... |

ARCHIVING OF TOPMOST RANKED ANSWERS OF A COGNITIVE SEARCH

BACKGROUND

The present disclosure relates generally to re-traceability of answers of a cognitive engine, and more specifically, to improving the archiving of topmost ranked documents found during a query using a cognitive system.

Currently, enterprises look for ways to improve their decision-making and customer management process—among others—by using cognitive systems. One implementation option for cognitive systems is based on using natural language as an input to generate one or more answers, (possibly using a weighting factor to rate the confidence of an answer), to a question. However, typically, cognitive systems are a sort of black-box. Thus, it is difficult to understand, retrace, and/or reproduce a specific answer at a later time. One reason for this can be that the knowledge base has been changed between the first and a second asking and answering of a question. Another reason could be the learned models have changed. However, to develop trust and confidence in these kinds of systems, it is important to know the facts used to determine the original answer.

SUMMARY

Aspects of the present disclosure are directed toward a method for archiving topmost ranked documents, the method comprising receiving a first query into a cognitive system, where the cognitive system comprises a cognitive engine, a plurality of stored documents, and a related learned model. The method can further comprise determining a first result of the first query against the cognitive system based on the related learned model, where the first result comprises a plurality of evidence fragments and ranking the plurality of evidence fragments. The method can further comprise determining for the first query a first list of documents comprising documents selected from the plurality of stored documents, where respective documents in the first list of documents relate to the plurality of evidence fragments. The method can further comprise determining metadata of the documents in the first list of documents and removing a first document from the plurality of stored documents, where the first document is an element of the first list of documents, and where the first document does not relate to topmost ranked evidence fragments. The method can further comprise redetermining a second result comprising a second list of documents of the first query of the plurality of stored documents without the first document, where the documents in the second list relate to the plurality of evidence fragments. The method can further comprise determining a confidence cliff and comparing the first list of documents with the second list of documents. The method can further comprise, in response to determining identical documents in the first list of documents and the second list of documents up to the confidence cliff, removing a second document from the plurality of stored documents, where the second document is an element of the first list of documents and the second list of documents, and where the second document does not relate to the topmost ranked evidence fragments. The method can further comprise storing the metadata of respective documents of the first list of documents, the plurality of evidence fragments, and the first query.

Further aspects of the present disclosure are directed toward a system and computer program product having similar characteristics as the method discussed above. The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
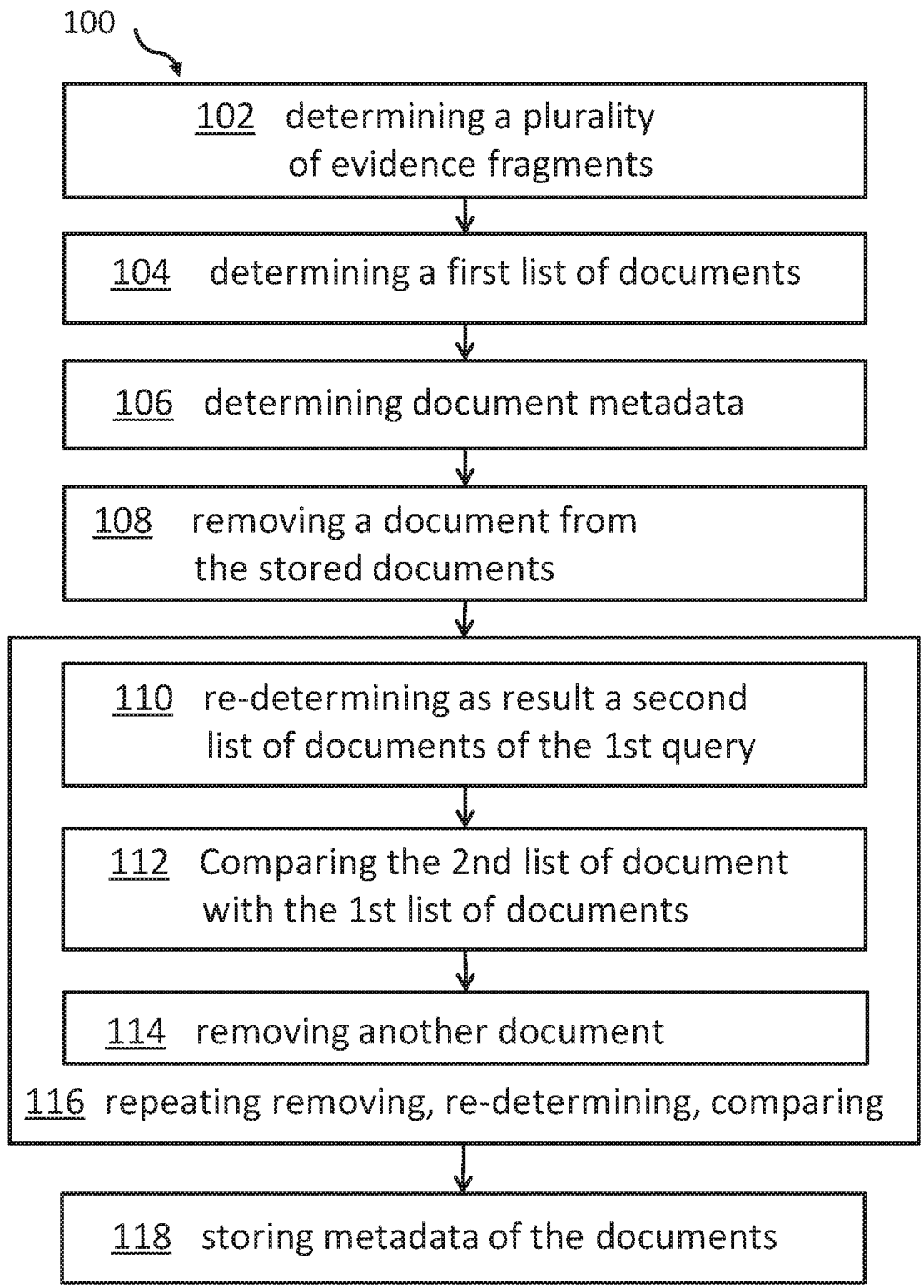
FIG. 1 shows a flowchart of an example method for archiving of topmost ranked documents of a result of a query against a cognitive system, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Cognitive systems are gaining widespread use across all aspects of technology. One implementation option for cognitive systems is based on using natural language as an input to generate one or more answers, (possibly using a weighting factor to rate the confidence of an answer), to a question. However, typically, cognitive systems are a sort of black-box. Thus, it is difficult to understand and retrace or to reproduce a specific answer at a later time. One reason for this can be that the knowledge base may have changed between the first and a second asking of a question. Another reason is the learned models may have changed. However, to develop trust and confidence in these kinds of systems, it is useful to know the facts, processes, and models used to determine the previous answer. Traditional systems are hindered in the ability to retrace or replicate an answer because of the large amount of data traditionally needed to retrieve and/or replicate an answer.

Aspects of the present disclosure can reduce an amount of storage required in order to retrace and reproduce the answer of a cognitive system at a later point in time. Some embodiments of this disclosure can be effective even if the knowledge body—i.e., the corpus—and the learned models have been changed between the first answer and a second answer for the same question. Thus, it may no longer be required to store the complete corpus—i.e., all documents of the knowledge body—in order to provide re-traceability of an answer that was generated by a cognitive engine. In some embodiments, the amount of storage saved can range from a factor of about 10 to about 100, while in other embodiments, the data compression can be a factor of 1000 or more. Thus, only $\frac{1}{1000}$ (or less) of the original knowledge body and learned model data with the required evidence fragments can reproduce the original answer with sufficient accuracy.

In the context of this description, the following conventions, terms and/or expressions can be used:

The term 'query' can denote a question posed to a cognitive engine. Typically, and in the classical sense of information management, a query can be an SQL statement (structured query language). However, in the context of cognitive computing, and this disclosure, a query can also be a question in a natural language.

The term 'document(s)' can denote any data, in text form, as speech/voice, music/sound, image, video, or any other human or machine-readable stored information. The sum of documents together can be denoted as a data corpus (or knowledge corpus data, or corpus) and together with a learned model (or more) it can be denoted as ground truth for the cognitive engine. This can basically represent the knowledge a cognitive system has, i.e., the knowledge base. The documents can typically relate to a specific subject-matter. Additionally, in the context of the here presented disclosure, the term document can be used synonymously for the term evidence fact. Although, a typical artificial intelligence machine can differentiate between documents and evidence facts.

The term 'evidence fragments' can denote a small fragment of data out of one of the documents. Evidence fragments can be ranked according to their probability of building or supporting an answer to the question posed to the cognitive system. Additionally, an evidence fragment can also be a conclusion based on a part of a document.

The term 'machine learning' is known to be a subset of artificial intelligence and can enable a computer system to "learn" (i.e., progressively improve performance on a specific task) with data, without being explicitly programmed. Thus, the term 'learned model' can denote a machine learning model or response system enabling a computer system to respond to an input data pattern based on having been trained with training data and a defined outcome relating to the training data.

The term 'cognitive system' can denote a computing system used for reasoning, based on a corpus of facts and interrelationships between facts stored as—almost completely—human understandable documents. Cognitive computing performed by a cognitive system can also be denoted as artificial intelligence (AI, also machine intelligence) which can be a sort of intelligence demonstrated by machines, in contrast to the natural intelligence displayed by humans and other animals. In computer science, AI research is defined as the study of "intelligent agents": any device that perceives its environment and takes actions that maximize its chance of successfully achieving its goals. Colloquially, the term "artificial intelligence" can be applied when a machine mimics "cognitive" functions that humans associate with other human minds, such as "learning" and "problem solving".

The term 'cognitive engine' can denote a system in the sense of the above definition of a cognitive system. It can decompose a question in a natural language, can access a large plurality of documents, which can be stored separate from the cognitive engine, can use a search engine, filtering agents, and a scoring system for potential answers and eventually a speech synthesis element in order to articulate an answer to the question.

The term 'topmost ranked evidence fragment' can denote those evidence fragments having the highest confidence level or confidence level value and, consequently, relate to the documents having the highest confidence levels. In some embodiments, the confidence level can be expressed as a probability factor or a type of score. The same can be valid for evidence fragments.

The term 'topmost ranked documents of a result' can denote documents that have the highest probability that they were relied upon by the cognitive machine to determine the answer. Aspects of this disclosure recognize a sequence of documents exist that can underlie an answer to a cognitive machine. The answer can be based on, or can be one of, the evidence fragments for which a corresponding document exists. Typically, the documents relating to the highest ranked—most probable—evidence fragments can be the topmost ranked documents.

The term 'result' can denote a list of documents of the question posed to the cognitive system. The result can be a ranked list of documents in which the topmost ranked document can relate to the topmost evidence fragment. Typically, the ranking of the evidence fragment—i.e., also the documents—can be performed according to a confidence value or score.

The term 'optimized archiving' or 'archiving' can denote that only a portion of the knowledge body, evidence fragments, the cognitive engine code and the trained or learned models need to be stored. This can significantly reduce the amount of required storage, while at the same time, the reasoning process, the used data, and other dependencies can be comprehendible at a time after the original query.

The term 'confidence cliff' can denote to a document in the result list being determined either statically or dynamically. Examples of a static determination can be a simple rank in the list of documents or a predefined confidence level. A dynamic determination of the confidence cliff can use the $1^{st}$ derivative of the confidence levels.

Some embodiments of the present disclosure comprise a computer-implemented method for archiving of topmost ranked documents of a result of a query against a cognitive system. Or said differently, embodiments of the present disclosure can rank the plethora of documents used by a cognitive system in answering a question. This subset of documents, selected from the documents in the corpus, can be stored. This will provide a means to understand how the answer was reached while only storing a small percentage of the information used to obtain the answer.

Aspects of the present disclosure used for archiving of topmost ranked documents can offer multiple advantages and technical effects.

Aspects of the present disclosure are based on removing documents related to evidence fragments from which the answer is generated however, removing the documents will not change the answer or lower the confidence of the answer below a confidence threshold. Embodiments of the present disclosure recognize it would be useful if the cognitive engine using the learned model would be agnostic against missing documents in the knowledge body. Such can be achieved. By adjusting a confidence cliff manually or automatically using different methods based on the required accuracy of the answer, the compression factor for the original corpus can be adjusted individually.

In some embodiments, the result of the query can be regenerated with the reduced number of documents. This can be done to ensure the answer remains the same without saving the entire corpus.

In the following, additional embodiments of the present disclosure will be described.

According to some embodiments, the learned model can be agnostic to a missing document in the plurality of stored documents. Thus, it may be irrelevant that a document is deleted in the archived version of the knowledge body—i.e., the ground truth of the cognitive system. This can be a useful feature because the archived version of the answer and the surrounding context—i.e., topmost ranked evidence fragments as well as topmost ranked documents—may not have the full ground truth if compared to the version at the time of the original result and answer. Thus, in order to have a reproducibility or re-traceability of the answer/result, the cognitive engine can be enabled to function correctly with only a portion of the original number of documents.

According to one embodiment, the metadata can comprise one or more pieces of information related to a document including but not limited to name, at least one document author, a document source, a document publishing date, at least one of document bibliographic data, an International Standard Book Number, i.e., ISBN, a web-link, e.g., in form of an HTTP address (HyperText Transfer Protocol). Thus, any metadata describing the document or being helpful in re-accessing the document can be used and stored instead of the original document resulting in a substantial reduction in the amount of data to be stored in order to access the original document. It can also be noted that document types can come in any form like text, voice, image, video, PDF (portable document format), and the like. Basically, any machine readable and/or interpretable document format can be used.

According to one embodiment, storing the metadata can also comprise storing information about at least one learned model. This can comprise training data and desired results/answers, the corpus data at the time of the training, the number of training runs, and similar data describing the status of the related machine learning model. Additionally, storing can also comprise a version number of the cognitive engine version at the time of the first query. Thus, the context of the first query can easily be reproduced.

According to some embodiments, storing the metadata can also comprise storing only the topmost evidence fragments of the plurality of evidence fragments, i.e., those evidence fragments having the highest confidence value. Thus, only the topmost 1% or up to e.g. 10% of the evidence fragments can be stored.

According to some embodiments, the confidence cliff can be expressed as a predefined number of documents. This number can be the document after which the confidence level of the document relating to the topmost evidence fragments show a significant change, e.g., at the point where the absolute value of the derivative of the confidence level can have a local maximum. However, other rules than the above-described dynamic determination for the confidence cliff can be defined. E.g., a static value can be used, e.g., the $10^{th}$ document, a number of evidence fragments, or any other predefined number.

According to some embodiments, the confidence cliff can relate to a document in the first list with a predefined confidence level. This can also be seen as a static determination approach which can require less computational effort if compared to a dynamic determination of the confidence cliff value.

According to some embodiments, the confidence cliff can be determined by determining a confidence level polynomial using absolute values of confidence levels of documents of the first list and setting the confidence cliff to the document at or just after the polynomial's first local maximum. Thereby, it can be assumed that the derivative of the confidence level (or confidence level value) of the first document, for example, the one relating to the highest ranked evidence fragment, is equal to zero. This way, the local maximum can be determined using known algorithms.

According to some embodiments, a list of answers relating to the first query can be determined by the cognitive engine together with a scoring of the answers. The scoring can also be interpreted as the confidence level or confidence level value.

In some embodiments, the cognitive system can comprise a cognitive engine, a plurality of stored documents and at least one related learned model. In such embodiments, the method can further comprise, determining for the result of a first query against the cognitive system based on the at least one related learned model, a plurality of evidence fragments; and determining, as the result of the first query, a first list of documents out of the plurality of stored documents. Thereby, the documents in the first list may relate to the plurality of determined evidence fragments.

Furthermore, the method may comprise determining metadata of the first list of documents, removing a document from the stored documents, where the removed document is an element of the resulting first list of documents, and where the removed document does not relate to topmost ranked evidence fragments, and redetermining as a second result a second list of documents of the first query out of the plurality of stored documents without the removed document, wherein the documents in the first and second list relate to the plurality of determined evidence fragments.

Additionally, the method may comprise comparing the first list of documents with the second list of documents, and upon determining identical documents in the compared first and second list of documents up to a confidence cliff, removing another document from the stored documents, wherein the removed other document is an element of the resulting list of documents, and wherein the other document does not relate to the topmost ranked evidence fragments.

In some embodiments, the method further comprises, while said first list of documents and said second list of documents are equal up to said confidence cliff and documents remain in said stored documents, repeating the steps of removing another document, redetermining, and comparing.

According to another aspect of the present disclosure, a related system for archiving of topmost ranked documents of a result of a query against a cognitive system may be provided.

Furthermore, embodiments may take the form of a related computer program product, accessible from a computer-usable or computer-readable medium providing program code for use, by, or in connection with, a computer or any instruction execution system. For the purpose of this description, a computer-usable or computer-readable medium may be any apparatus that may contain hardware and/or software for storing, communicating, propagating or transporting the program for use, by, or in connection, with the instruction execution system, apparatus, or device.

In the following, a detailed description of the figures will be given. All instructions in the figures are schematic. Firstly, a flowchart of some embodiments of the disclosed computer-implemented method for archiving of topmost ranked documents of a result of a query against a cognitive system is given. Afterwards, additional embodiments, as well as embodiments of the system for archiving of topmost ranked documents of a result of a query against a cognitive system, will be described.

FIG. 1 is a block diagram of an embodiment of the computer-implemented method 100 for archiving of topmost ranked documents of a result of a query—here, a question expressed in a natural language—against a cognitive system. The cognitive system can comprise at least a cognitive engine, a plurality of stored documents (i.e. the corpus for specific subject-matter) and at least one related learned model. Together, the plurality of stored documents as well as the trained machine learning model can define the ground truth of the cognitive engine.

Step 102 of method 100 comprises determining a plurality of evidence fragments for the result of a first query against the cognitive system based on the at least one related learned model. In some embodiments the plurality of evidence fragments can be ranked according to a confidence level.

Step 104 of method 100 comprises determining a first list of documents, as the result of the first query against a first list of documents out of the plurality of stored documents, where the documents in the first list relate to the plurality of determined evidence fragments. The first list typically comprises at least a document number, a document title, and a confidence level.

Step 106 of method 100 comprises determining metadata of the documents of the first list of documents with which the documents can be identified without needing the document itself.

Step 108 of method 100 comprises removing at least one document from the stored documents. In some embodiments, at least one document is removed from the stored documents by setting a removal flag, so that the document will not be used as part of the corpus during subsequent queries. Thereby, the removed document is an element of the resulting first list of documents, where the removed document does not relate to topmost ranked evidence fragments. Thus, the document can appear in the resulting first list, but in a subordinate position, in particular, below the confidence cliff.

Step 110 of method 100 comprises redetermining as a second result a second list of documents of the first query out of the plurality of stored documents without the removed document, where the documents in the second list relate to the plurality of determined evidence fragments.

Step 112 of method 100 comprises comparing the first list of documents to the second list of documents. Typically, this is done list element by list element, for example, row by row. Step 112 can further include determining identical documents in the compared first and second list of documents up to a confidence cliff.

Step 114 of method 100 comprises removing another document from the stored documents. Thereby, the removed other document is an element of the resulting list of documents, and the other document does not relate to the topmost ranked evidence fragment. Or said differently, the removed document is below the threshold confidence and both lists are equal up to the threshold confidence.

Step 116 of method 100 comprises redetermining the second list of documents, comparing the redetermined second list of documents against the first list of documents, where some documents have been removed, and removing another document. In some embodiments, this process is repeated as long as the first list of documents, and the second list of documents are equal (e.g., equivalent, identical, similar, etc.) up to the confidence cliff. In other words, as long as the lists of documents up to the confidence cliff are equal, the loop continues.

Step 118 of method 100 comprises storing the metadata of the documents of the first list (i.e. the result in a shortened form), the plurality of evidence fragments, and the first query. It is noted that instead of storing the complete documents, only metadata of the documents is stored. This reduces the amount of stored data significantly and enables a user to reproduce or at least comprehend the answer produced by the cognitive engine at a later point in time after the first query was posed to the cognitive system.

Figure 2:
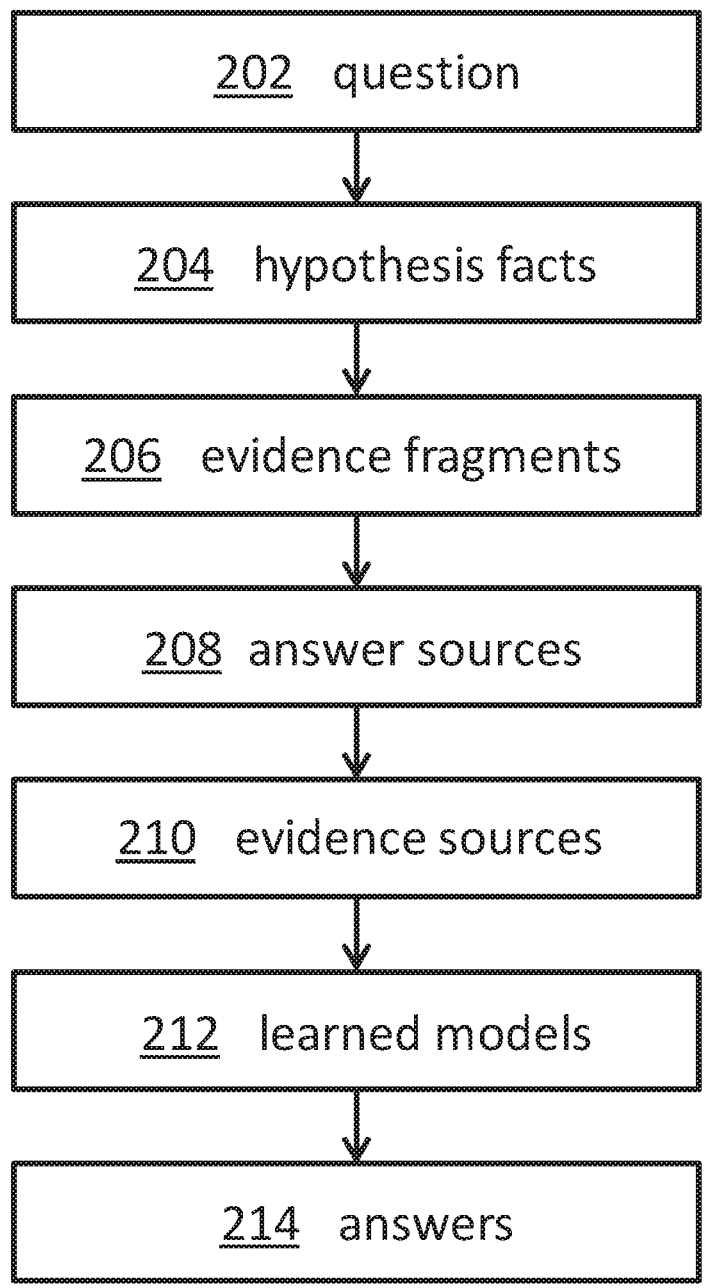
FIG. 2 shows a block diagram illustrating high-level components of a cognitive engine, in accordance with embodiments of the present disclosure.

FIG. 2 generally labeled 200 shows a block diagram illustrating high-level components of a cognitive engine relevant for the proposed concept. A person having ordinary skill in the art will understand that the shown block diagram is consistent with the general mode of operation of cognitive engines: A linguistic preprocessor (often also receiving a category as basis for a question) receives a natural language question. After some preprocessing (relationship analysis, focus analysis, lexical mapping, tokenizing), the question can be separated in partial questions. The lexical mapping can be performed using a plurality of different data sources. The partial questions can be used to generate a plurality of potential answers—denoted as candidates or hypotheses—using one or more search engines. The hypotheses are then evaluated and assessed using a plurality of parallel working agents or expert systems (e.g., trained AI models). As a result of the agent evaluation, a large number of evidence fragments can be generated (e.g., 100 to 250 hypotheses can result in, e.g., 100,000 evidence fragments). A list of answers is generated with related weight factors or relevance factors (also denoted as confidence factors). Finally, and optionally, a speech synthesis can be used to generate a resulting answer in natural language based on the potential answer having the highest confidence factor.

Coming back to FIG. 2, based on the question 202, a plurality of hypotheses or hypothesis facts 204 are generated which relate to a larger plurality of evidence fragments 206. The evidence fragments 206 relate to some of the plurality of answer sources 208, i.e., a total plurality of documents. The total number of evidence fragments 206 can then be reduced to useful evidence sources 210 which relate to a reduced number of documents. In this context, learned models 212 are applied as expert system or agents (see above), and the answer 214 can be the evidence fragment with the topmost confidence level, or a list of documents with the highest probabilities/confidence levels.

Figure 3:
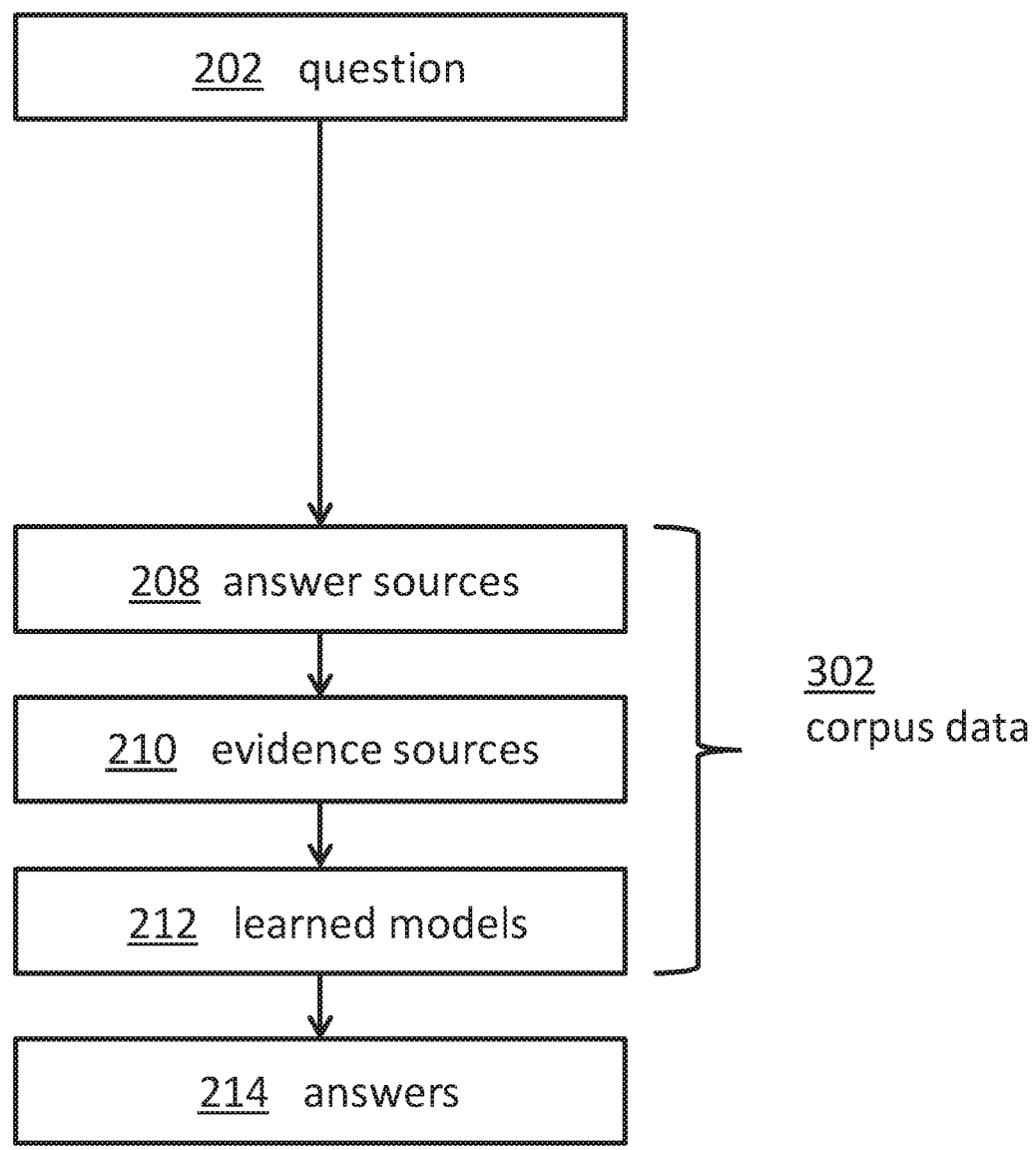
FIG. 3 shows a block diagram of relevant corpus data, in accordance with embodiments of the present disclosure.

FIG. 3 shows a block diagram 300 of relevant corpus data 302 that can be stored in order to render an answer traceable after a period of time after the initial answer was generated. During the period of time, the corpus data—e.g., the underlying document bases—used for the cognitive engine as well as a version of the cognitive engine and/or trained models can change. However, in order to understand at a later point in time why a specific answer was generated for a specific question, the corpus data comprising answer sources 208—i.e., documents relevant for the answer—evidence sources 210 (which can be seen as identical to the answer sources, however, in some implementations one can differentiate between documents and facts derived from the documents), one or more learned models 212 and the answer(s) 214 with the highest confidence levels beside the original question 202 need to be stored. It is noted that the most probable answer is identical to the evidence fragment having the highest probability to be correct, i.e., the highest confidence level.

Using only metadata for the documents—e.g., document name, document author(s), document source(s), publishing date, bibliography data, an ISBN (International Standard Book Number) and similar—will reduce the amount of data to be stored as corpus data significantly. It is also noted that the documents can be available not only as simple text documents, but also in PDF format, HTML format, as image, sound, video, or any other form interpretable by a cognitive engine. Additionally, data compression techniques can be applied to further reduce the data volume to be stored.

Summarized, the answer sources 208 representing the totality of documents from which the evidence sources 210 are derived—i.e., those documents supporting the answer—as well as the learned models 212 represent corpus data 302 that includes slow changing data which can be changed after a plurality of question/answer pairs, e.g., if new documents enter the document base. In some embodiments, this data corpus can be stored once for a plurality of question/answer pairs as long as the documents base is not changed.

Figure 4:
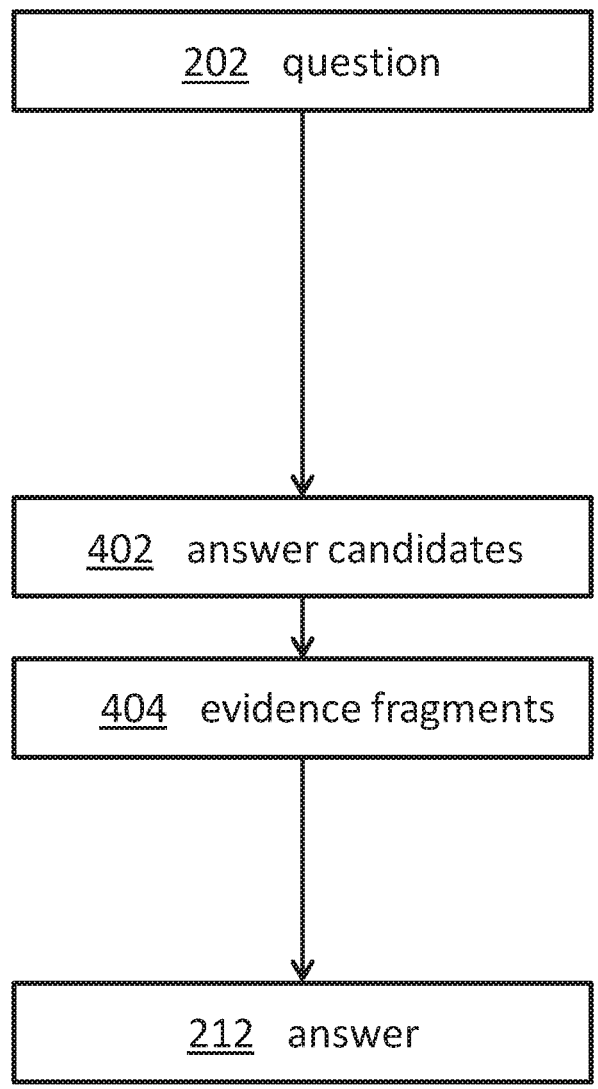
FIG. 4 shows a block diagram of question specific data/documents, in accordance with embodiments of the present disclosure.

In contrast to FIG. 3, FIG. 4 shows a block diagram 400 of question specific data/documents to be stored. The question specific data change from question to question. The general approach—i.e., the approach to reduce the required amount of data—can be described as follows: In step A the cognitive engine performs the original or first run and stores the "answer candidate" 402 (i.e., also known as hypothesis) and related "evidence fragments" 404 of this run for a question 202. In step B, using a grade (e.g., a derivative) of the curve regarding confidence levels of the documents relating to the evidence fragments for a $1^{st}$, $2^{nd}$ or $3^{rd}$ confidence cliff, the number of answer sources is reduced according to the $1^{st}$, $2^{nd}$ or $3^{rd}$ confidence cliff, and an answer 212 is generated. For the concept of the confidence cliff refer to FIG. 5.

In a next run, step C, a re-run of the answer generation is performed, however, now with the reduced answer sources (i.e., reduced number of documents) which are intermediately stored answers of the answer candidates together with related evidence fragments of this run.

Then, in step D, the results of step A and step B are compared. If the resulting data differences, i.e., differences in documents between the document lists, are below a threshold, the data to be stored is acceptably small and the procedure stops.

If the comparison shows that the results of step A and step B i.e., the resulting documents, differ by more than the threshold, then, a next step E is performed: re-running the above sequence as often as required to meet the defined threshold.

This way, the minimum possible number of documents 302 and evidence fragments 304 are stored for a given question 202 (i.e., query) and a related answer 212. It can also be noted that only the topmost evidence fragments will be stored, e.g. the top 1% up to an exemplary limit of 10% of all evidence fragments.

Figure 5:
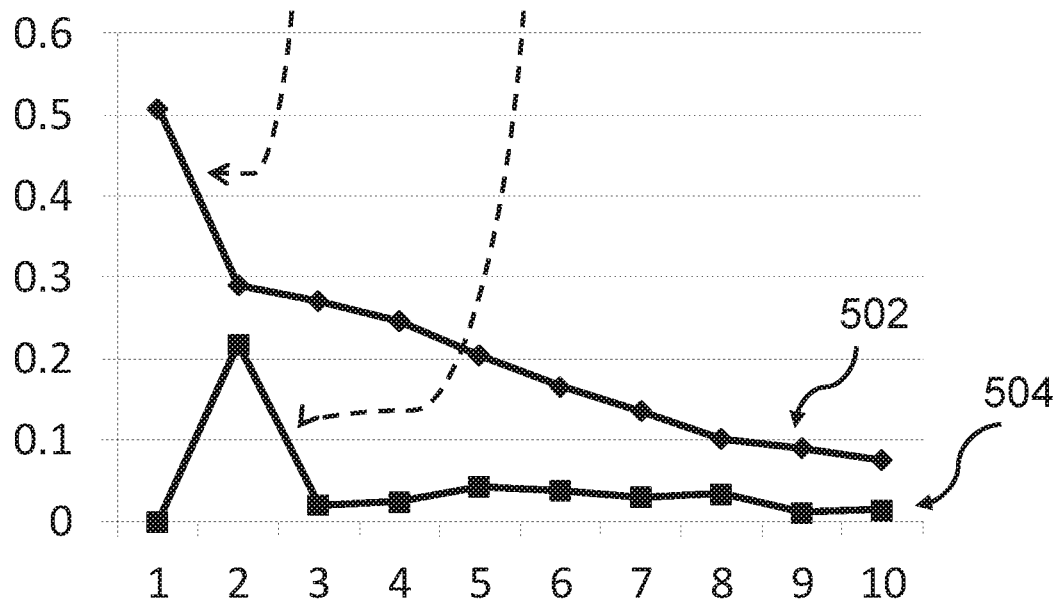
FIG. 5 shows a table and graph illustrating the concept of the confidence cliff, in accordance with embodiments of the present disclosure.

FIG. 5 is useful in explaining the concept of the above-mentioned confidence cliff. Out of the confidence levels of the evidence fragments, a confidence value of related documents is generated, as shown in table 500 (only the $1^{st}$ 10 documents are shown, exemplarily). Besides the confidence value of a document, the number of the document (doc-id), and a title of the documents are listed, as examples, in FIG. 5. Such a table can be a partial outcome of a run of the cognitive engine. However, the data shown are enough to explain the concept of the confidence cliff.

Besides the confidence values, a grade (i.e., $1^{st}$ derivative) is determined at each confidence value. The table is sorted according to the confidence values.

The bottom part of FIG. 5 shows a diagram of the curve 502 of the confidence value and the curve of $1^{st}$ derivative 504. The x-axis shows a running number of documents (not shown in the table above). The y-axis shows the numerical values of the confidence values and the related $1^{st}$ derivative. The dashed lines from the table to the diagram show the relationship between the "confidence" column and "grade" column to the curves 502 and 504.

As can be seen, the $1^{st}$ derivative (i.e., grade) in the curve of the confidence values shows a peak at the point of the $2^{nd}$ document. This suggests that the document with number 3 and higher do not seem to be relevant for the evidence fragments, i.e., the related documents, and thus for the answer (which is the first evidence fragment). Hence, a confidence cliff can be set to document number 2. Thereby reducing the number of documents for a re-run of the answer generation (e.g., see FIG. 4) by removing a document having a higher number in the sorting according to the table 500 than the document defining the confidence cliff.

It can also be noted that the confidence cliff can be defined in a static way, e.g., by defining a minimum number of documents or in another way.

Figure 6:
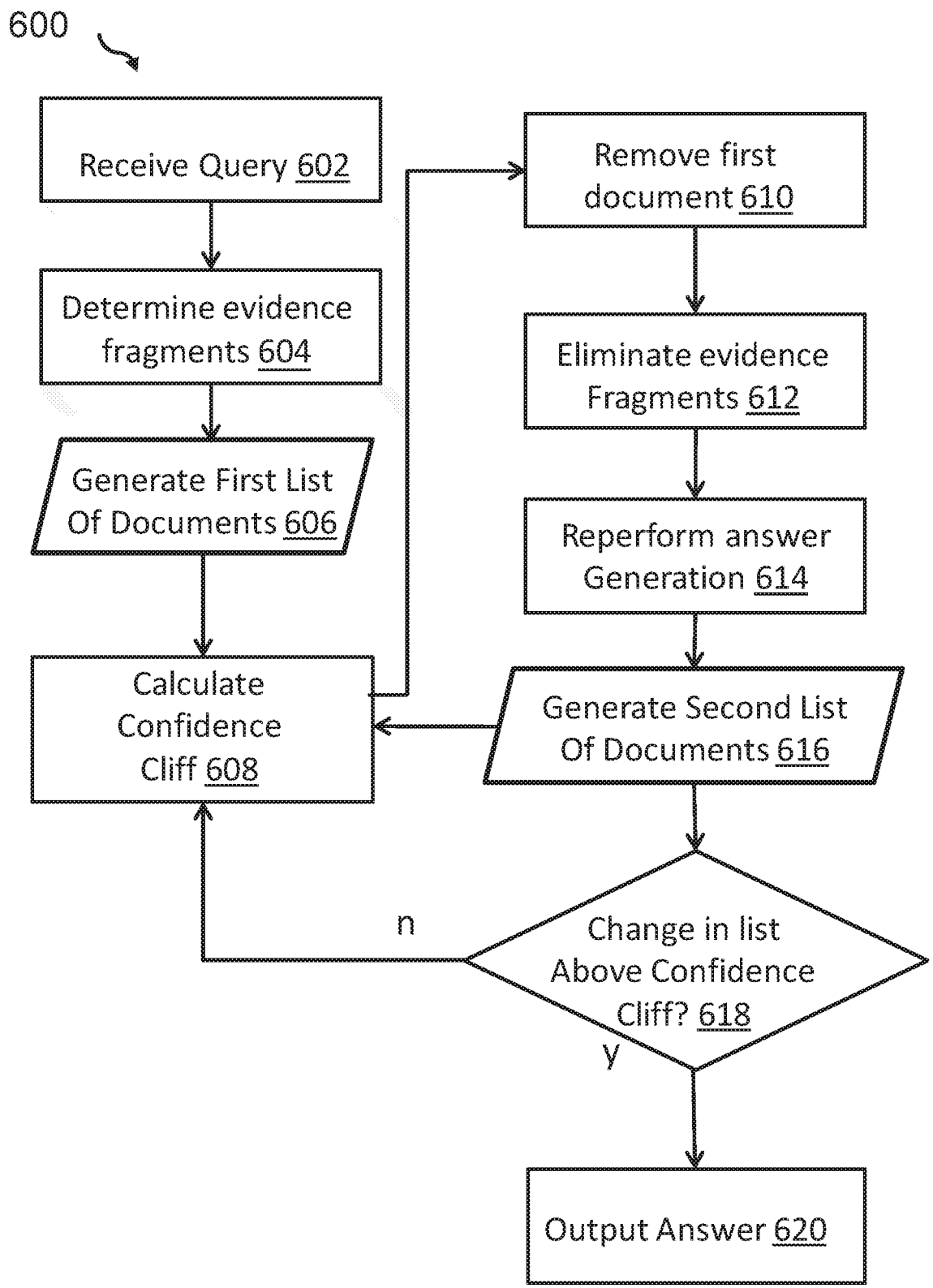
FIG. 6 shows a flowchart of an example method for outputting an answer, in accordance with embodiments of the present disclosure.

FIG. 6 shows a flowchart 600 of an example method for outputting an answer.

Step 602 of process 600 comprises receiving a question to the cognitive system. Step 604 of process 600 comprises a first round of determination. In some embodiments, the first round of determination includes determining a plurality of evidence fragments and determining the documents that correspond to each evidence fragment (e.g., see FIG. 1, 102, 104). Step 606 of process 600 comprises compiling a first list of documents. In some embodiments, the documents are numbered $A_1$ to $A_n$. In some embodiments, there can be a 1:1 relationship between the evidence fragments and the documents or in some embodiments there can be an n:m relationship.

Step 608 of process 600 comprises calculating a confidence cliff. In some embodiments, a confidence cliff is calculated using the concept according to FIG. 5. In some embodiments, a document $A_k$ marks the cliff level.

Step 610 of process 600 comprises making one or more documents unavailable for a re-run of the cognitive engine. In some embodiments, the one or more documents made unavailable are below the cliff level. In some embodiments, the one or more documents are made unavailable by removing them from the corpus. Step 612 of process 600 comprises the option of eliminating evidence fragments related to the documents made unavailable.

Step 614 of process 600 comprises reperforming the answer generation using the reduced number of evidence fragments and related documents. Step 616 of process 600 comprises generating a second list of documents. In some embodiments, the second list of documents is labeled $A'_1$ to $A'_n$. In some embodiments a new confidence cliff value is determined, using the regenerated answer, in the same manner as performed in step 608, and is labeled $A'_k$.

In step 618 process 600 determines whether there is a change in the list of documents above the confidence cliff for the document $A_1$ to $A_n$ and the documents $A'_1$ to $A'_n$. If that is the case, the algorithm terminates and proceeds to step 620. Otherwise, the process loops back—case "n"—to the step 608 of computing the confidence cliff $A_k$.

In step 620, process 600 outputs, as answers, evidence fragments there were the highest confidence level and stores all documents above the confidence cliff together with a reduced list of evidence fragments as well as the question and the answer.

However, as previously mentioned, instead of storing the documents, only metadata of the documents may be stored. Additionally, only a fraction of the evidence fragments—e.g., the topmost 1% of evidence fragments up to an exemplary 10% of the evidence fragments—may be stored. Both activities help to reduce the amount of stored data (archived data) significantly.

Figure 7:
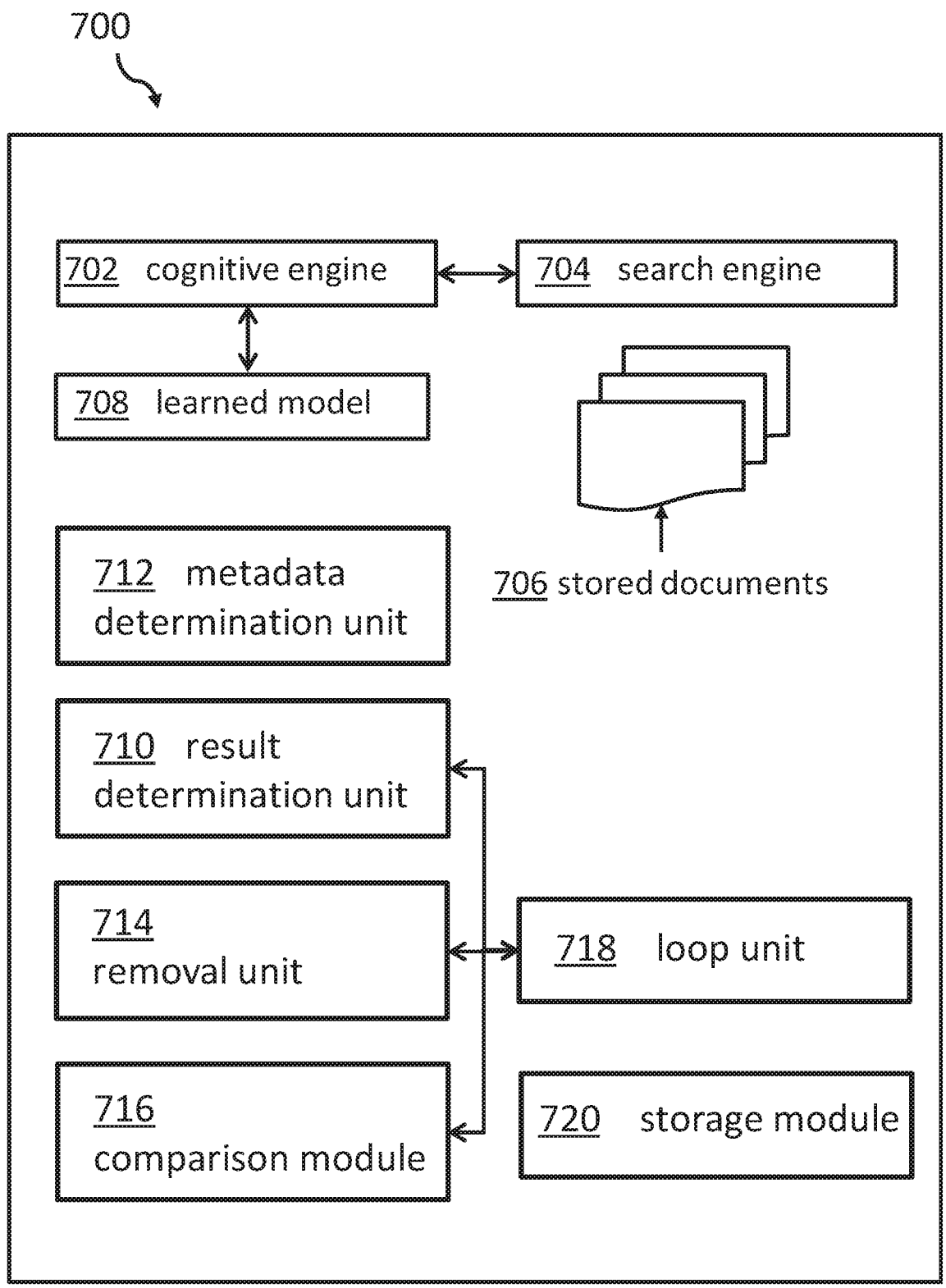
FIG. 7 shows a simplified block diagram of a system for archiving of topmost ranked documents of a result of a query against a cognitive system, in accordance with embodiments of the present disclosure.

FIG. 7 shows a simplified block diagram of a cognitive system 700 for archiving of topmost ranked documents of a result of a query against a cognitive system 700. The cognitive system 700 comprises at least one cognitive engine 702, a search engine 704, a plurality of stored documents 706, and at least one related learned model 708. The cognitive system 700 comprises a result determination unit 710 adapted for determining, for the result of a first query against the cognitive system 700 based on the at least one related learned model 708, a plurality of evidence fragments, where the result determination unit 710 is further adapted for determining, as the result of the first query, a first list of documents out of the plurality of stored documents, where the documents in the first list relate to the plurality of determined evidence fragments.

The cognitive system 700 also comprises a metadata determination unit 712 adapted for determining metadata of the documents of the first list of documents, and a removal unit 714 adapted for removing a document from the stored documents, where the removed document is an element of the resulting first list of documents, and where the document does not relate to topmost ranked evidence fragments. The result determination unit 710 is also adapted for redetermining as second result a second list of documents of the first query out of the plurality of stored documents without the removed document, where the documents in the first and second list relate to the plurality of determined evidence fragments.

A comparison module 716 is adapted for comparing the first list of documents with the second list of documents, and the removal unit 714 is also adapted for, upon determining identical documents in the compared first and second list of documents up to a confidence cliff, removing another document from the stored documents, where the removed other document is an element of the resulting list of documents, and where the other document does not relate to the topmost ranked evidence fragments.

A loop unit 718 is adapted for triggering the removal unit 714, the determination unit 710 for the redetermination and the comparison module 716 as along as said first list of documents and said second list of documents are equal up to said confidence cliff and documents remain in said stored documents. The cognitive system 700 also comprises a storage module 720 adapted for storing metadata of the documents of the first list, the plurality of evidence fragments, and the first query.

Figure 8:
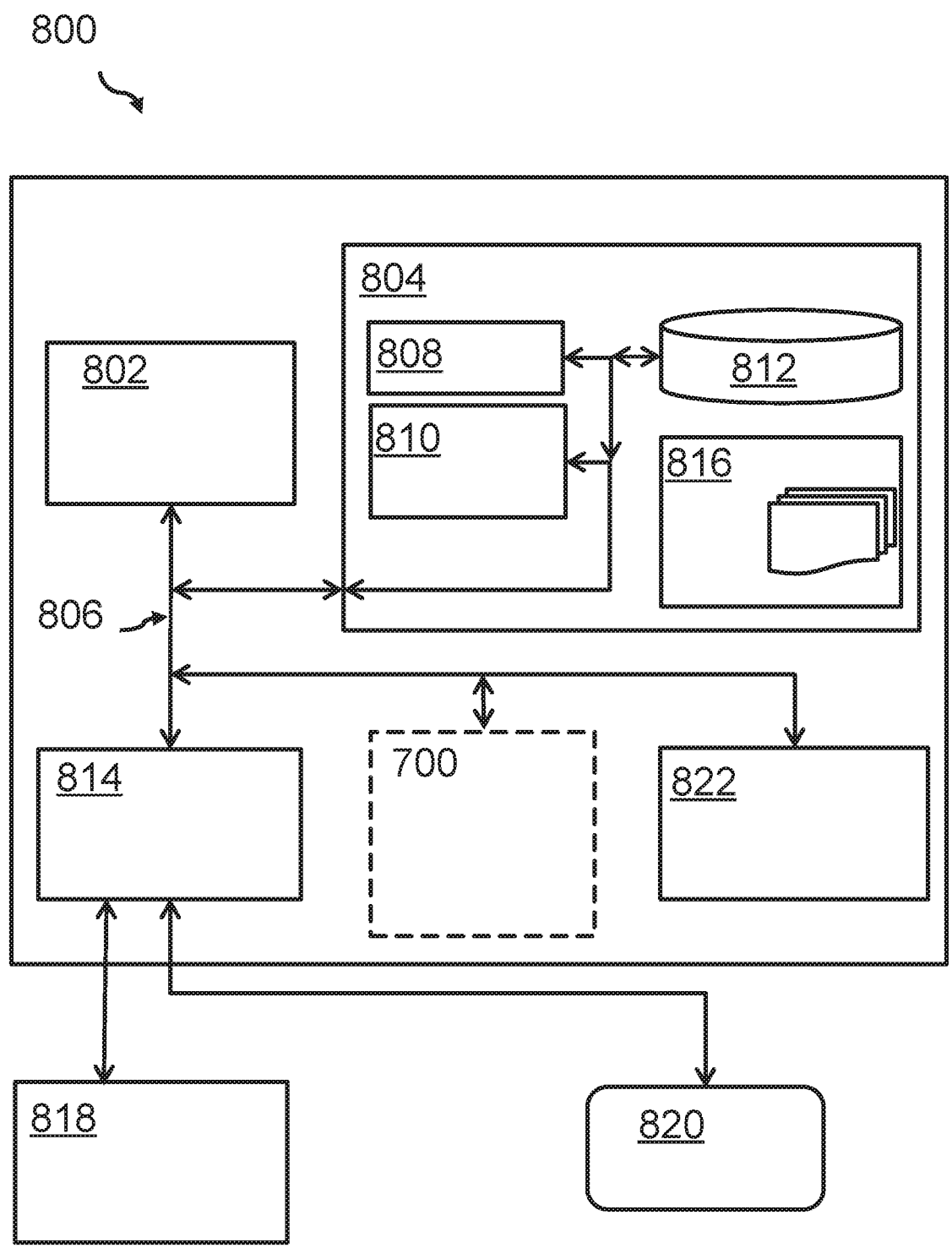
FIG. 8 shows a block diagram of a computing system capable of executing program code related to aspects of the present disclosure.

Embodiments of the present disclosure can be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system and is not intended to suggest any limitation as to the scope of use or functionality of embodiments of the present disclosure described herein, regardless, whether the computer system 800 is capable of being implemented and/or performing any of the functionality set forth hereinabove. In computer system 800, there are components, which are operational with numerous other general purpose or special purpose computing system environments or configurations. Examples of well-known computing systems, environments, and/or configurations that can be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 800 can be practiced in distributed cloud computing environments where tasks are performed by remote processing devices that are linked through a communications network. In a distributed cloud computing environment, program modules can be located in both, local and remote computer system storage media, including memory storage devices.

As shown in the figure, computer system/server 800 is shown in the form of a general-purpose computing device. The components of computer system/server 800 can include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media can be any available media that is accessible by computer system/server 800, and it includes both volatile and non-volatile media, and removable and non-removable media.

The system memory 804 can include computer system readable media in the form of volatile memory, such as random access memory (RAM) 808 and/or cache memory 810. Computer system/server 800 can further include other removable/non-removable, volatile/non-volatile computer system storage media. By way of example only, a storage system 812 can be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media can be provided. In such instances, each can be connected to bus 806 by one or more data media interfaces. As will be further depicted and described below, memory 804 can include at least one program product having a set (e.g., at least one) of program modules that are configured to carry out the functions of embodiments of the present disclosure.

The program/utility, having a set (at least one) of program modules 816, can be stored in memory 804 by way of example, and not limiting, as well as an operating system, one or more application programs, other program modules, and program data. Each of the operating systems, one or more application programs, other program modules, and program data or some combination thereof, can include an implementation of a networking environment. Program modules 816 generally carry out the functions and/or methodologies of embodiments of the present disclosure, as described herein.

The computer system/server 800 can also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 can communicate with one or more networks such as a local area network (LAN), a general wide area network (WAN), and/or a public network (e.g., the Internet) via network adapter 822. As depicted, network adapter 822 can communicate with the other components of computer system/server 800 via bus 806. It should be understood that, although not shown, other hardware and/or software components could be used in conjunction with computer system/server 800. Examples include, but are not limited to: microcode, device drivers, redundant processing units, external disk drive arrays, RAID systems, tape drives, and data archival storage systems, etc.

Additionally, the cognitive system 700 for archiving of topmost ranked documents of a result of a query against a cognitive system can be attached to the bus system 806.

The descriptions of the various embodiments of the present disclosure have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure can be embodied as a system, a method, and/or a computer program product. The computer program product can include a computer readable storage medium (or media) having computer readable program instructions thereon for causing a processor to carry out aspects of the present disclosure.

The medium can be an electronic, magnetic, optical, electromagnetic, infrared or a semi-conductor system for a propagation medium. Examples of a computer-readable medium can include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions can execute entirely on the user's computer, partly on the user's computer as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description but is not intended to be exhaustive or limited to the present disclosure in the form disclosed. Many modifications and variations will be apparent to those of ordinary skills in the art without departing from the scope and spirit of the present disclosure. The embodiments are chosen and described in order to best explain the principles of the present disclosure and the practical application, and to enable others of ordinary skills in the art to understand the present disclosure for various embodiments with various modifications, as are suited to the particular use contemplated.

What is claimed is:

1. A computer-implemented method for archiving of topmost ranked documents, said method comprising:
   receiving a first query into a cognitive system, wherein said cognitive system comprises a cognitive engine, a plurality of stored documents, and a related learned model;
   determining a first result of said first query against said cognitive system based on said related learned model, wherein said first result comprises a plurality of evidence fragments and each evidence fragment is correlated to a document of the plurality of stored documents;
   ranking said plurality of evidence fragments;
   determining for said first query a first list of documents of said plurality of stored documents;
   determining metadata of each document in said first list of documents;
   removing a first number of documents from said plurality of stored documents, wherein said first number of documents are elements of said first list of documents, and wherein said first number of documents do not relate to topmost ranked evidence fragments;
   redetermining said first result comprising determining a second list of documents of said plurality of stored documents without said first number of documents;
   determining a confidence cliff;
   comparing said first list of documents with said second list of documents;
   determining said first list of documents and said second list of documents contain identical documents up to said confidence cliff;
   in response to determining identical documents in said first list of documents and said second list of documents up to said confidence cliff, removing a second number of documents from said plurality of stored documents, wherein said second number of documents is an element of said first list of documents and said second list of documents, and wherein said second number of documents does not relate to said topmost ranked evidence fragments; and
   storing said metadata of respective documents of said first list of documents, said plurality of evidence fragments, and said first query.

2. The method according to claim 1, further comprising:
   while said first list of documents and said second list of documents are equal up to said confidence cliff and respective documents in each list remain in said plurality of stored documents, repeating said step of removing a subsequent document, said step of redetermining a subsequent result, and said step of comparing said first list of documents and said second list of documents.

3. The method according to claim 1, wherein said related learned model is agnostic to a missing document in said plurality of stored documents.

4. The method according to claim 1, wherein said metadata comprises at least one piece of information selected from the group consisting of: a document name, a document author, a document source, a document publishing date, document bibliographic data, an International Standard Book Number, and a web-link.

5. The method according to claim 1, further comprising storing information about said related learned model and version information of said cognitive engine used in said first query.

6. The method according to claim 1, wherein said storing of said plurality of evidence fragments further comprises storing only said topmost evidence fragments of said plurality of evidence fragments.

7. The method according to claim 1, wherein said confidence cliff is a predefined number of documents.

8. The method according to claim 1, wherein said confidence cliff relates to a document in said first list of documents with a predefined confidence level.

9. The method according to claim 1, wherein said confidence cliff is determined by:
determining a confidence level polynomial using absolute values of confidence levels of documents of said first list of documents; and
setting said confidence cliff to said document after a first local maximum of said confidence level polynomial.

10. The method according to claim 1, wherein a list of answers relating to said first query is determined by said cognitive engine together with a scoring of said list of answers.

11. A system for archiving of topmost ranked documents comprising:
a processor; and
a computer-readable storage medium communicatively coupled to the processor and storing program instructions which, when executed by the processor, are configured to cause the processor to perform a method comprising:
receiving a first query into a cognitive system, wherein said cognitive system comprises a cognitive engine, a plurality of stored documents, and a related learned model;
determining a first result of said first query against said cognitive system based on said related learned model, wherein said first result comprises a plurality of evidence fragments and each evidence fragment is correlated to a document of the plurality of stored documents;
ranking said plurality of evidence fragments;
determining for said first query a first list of documents of said plurality of stored documents;
determining metadata of each document in said first list of documents;
removing a first number of documents from said plurality of stored documents, wherein said first number of documents are elements of said first list of documents, and wherein said first number of documents do not relate to topmost ranked evidence fragments;
redetermining said first result comprising determining a second list of documents of said plurality of stored documents without said first number of documents;
determining a confidence cliff;
comparing said first list of documents with said second list of documents;
determining said first list of documents and said second list of documents contain identical documents up to said confidence cliff;
in response to determining identical documents in said first list of documents and said second list of documents up to said confidence cliff, removing a second number of documents from said plurality of stored documents, wherein said second number of documents is an element of said first list of documents and said second list of documents, and wherein said second number of documents does not relate to said topmost ranked evidence fragments; and
storing said metadata of respective documents of said first list of documents, said plurality of evidence fragments, and said first query.

12. The system according to claim 11, wherein said related learned model is agnostic to a missing document in said plurality of stored documents.

13. The system according to claim 11, wherein said metadata comprises at least one piece of information selected from the group consisting of: a document name, a document author, a document source, a document publishing date, document bibliographic data, an International Standard Book Number, and a web-link.

14. The system according to claim 11, the program instructions are further configured to cause the processor to perform a method further comprising storing information about said related learned model and version information of said cognitive engine used in said first query.

15. The system according to claim 11, wherein the program instructions are further configured to cause the processor to perform a method further comprising storing only said topmost evidence fragments of said plurality of evidence fragments.

16. The system according to claim 11, wherein said confidence cliff is a predefined number of documents.

17. The system according to claim 11, wherein said confidence cliff relates to a document in said first list of documents with a predefined confidence level.

18. The system according to claim 11, wherein said confidence cliff is determined by:
determining a confidence level polynomial using absolute values of confidence levels of documents of said first list of documents; and
setting said confidence cliff to said document after a first local maximum of said confidence level polynomial.

19. The system according to claim 11, wherein said cognitive engine is adapted for determining a list of answers relating to said first query together with a scoring of said list of answers.

20. A computer program product for archiving of topmost ranked documents, the computer program product comprising a computer readable storage medium having program instructions embodied therewith, wherein the computer readable storage medium is not a transitory signal per se, the program instructions executable by a processor to cause the processor to perform a method comprising:
receiving a first query into a cognitive system, wherein said cognitive system comprises a cognitive engine, a plurality of stored documents, and a related learned model;

determining a first result of said first query against said cognitive system based on said related learned model, wherein said first result comprises a plurality of evidence fragments and each evidence fragment is correlated to a document of the plurality of stored documents;

ranking said plurality of evidence fragments;

determining for said first query a first list of documents of said plurality of stored documents;

determining metadata of each document in said first list of documents;

removing a first number of documents from said plurality of stored documents, wherein said first number of documents are elements of said first list of documents, and wherein said first number of documents do not relate to topmost ranked evidence fragments;

redetermining said first result comprising determining a second list of documents of said plurality of stored documents without said first number of documents;

determining a confidence cliff;

comparing said first list of documents with said second list of documents;

determining said first list of documents and said second list of documents contain identical documents up to said confidence cliff;

in response to determining identical documents in said first list of documents and said second list of documents up to said confidence cliff, removing a second number of documents from said plurality of stored documents, wherein said second number of documents is an element of said first list of documents and said second list of documents, and wherein said second number of documents does not relate to said topmost ranked evidence fragments; and storing said metadata of respective documents of said first list of documents, said plurality of evidence fragments, and said first query.

\* \* \* \* \*